United States Patent
Lindsay et al.

(10) Patent No.: US 7,103,587 B2
(45) Date of Patent: Sep. 5, 2006

(54) EFFICIENT INDEX-DATA FETCH VIA CALLBACK FOR TABLE DATA

(75) Inventors: Bruce G. Lindsay, San Jose, CA (US); Catherine S. McArthur, Uxbridge (CA); Michael J. Winer, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1153 days.

(21) Appl. No.: 09/757,431

(22) Filed: Jan. 10, 2001

(65) Prior Publication Data

US 2001/0037322 A1   Nov. 1, 2001

(30) Foreign Application Priority Data

Apr. 28, 2000   (CA) .................................. 2306968

(51) Int. Cl.
G06F 7/00      (2006.01)
G06F 17/30     (2006.01)
(52) U.S. Cl. ..................... 707/2; 707/1; 707/3; 707/10; 707/100
(58) Field of Classification Search .............. 707/1–10, 707/100
See application file for complete search history.

(56) References Cited

U.S. PATENT DOCUMENTS

| 5,455,944 | A | * | 10/1995 | Haderle et al. ............. 707/202 |
| 5,732,270 | A | | 3/1998 | Foody et al. ................ 395/683 |
| 5,794,228 | A | * | 8/1998 | French et al. ................... 707/2 |
| 5,806,058 | A | * | 9/1998 | Mori et al. ..................... 707/2 |
| 5,822,749 | A | * | 10/1998 | Agarwal ......................... 707/3 |
| 5,826,253 | A | * | 10/1998 | Bredenberg ..................... 707/2 |
| 5,835,904 | A | * | 11/1998 | Vicik et al. ................... 707/10 |
| 5,845,274 | A | * | 12/1998 | Chadha et al. ................. 707/2 |
| 5,913,061 | A | * | 6/1999 | Gupta et al. ................ 709/310 |
| 6,009,425 | A | * | 12/1999 | Mohan .......................... 707/8 |
| 6,049,800 | A | * | 4/2000 | Govindarajan et al. ........ 707/10 |
| 6,070,158 | A | * | 5/2000 | Kirsch et al. ................... 707/3 |
| 6,189,010 | B1 | * | 2/2001 | Isip, Jr. ...................... 707/100 |
| 6,192,358 | B1 | * | 2/2001 | Fuh et al. ....................... 707/4 |
| 6,353,820 | B1 | * | 3/2002 | Edwards et al. ............... 707/2 |
| 6,360,228 | B1 | * | 3/2002 | Sundara et al. ............. 707/102 |
| 6,363,387 | B1 | * | 3/2002 | Ponnekanti et al. .......... 707/10 |
| 6,393,415 | B1 | * | 5/2002 | Getchius et al. ............... 707/3 |
| 6,487,552 | B1 | * | 11/2002 | Lei et al. ....................... 707/3 |

* cited by examiner

*Primary Examiner*—John E. Breene
*Assistant Examiner*—Anh Ly
(74) *Attorney, Agent, or Firm*—Sawyer Law Group LLP

(57) ABSTRACT

A callback to a data manager is carried out from an index manager in a query processing system for an index-data fetch to enable an index page held stabilized by an index manager to remain stabilized during predicate checking or data consumption operations. The index manager locates a data identifier in an index and calls back to a data manager to access the data indicated by the data identifier. The data manager may carry out a predicate check or a data consuming operation on the data and if this is the case the index manager may access the next data identifier in the index when the data manager callback is complete. The index page need not be destabilized in such a case.

16 Claims, 1 Drawing Sheet

EFFICIENT INDEX-DATA FETCH VIA CALLBACK FOR TABLE DATA

FIELD OF THE INVENTION

The present invention is directed to an improvement in computing systems and in particular to an improvement in index access to data in a database management system.

BACKGROUND OF THE INVENTION

In database systems such as relational database management systems (RDBMSs), data is stored in tables. Most database systems such as RDBMS systems have one or more indexes relating to the data tables to allow efficient access to the data. In database systems, queries written in a language such as SQL are executed by the system fetching or retrieving the data specified by the query. In an RDBMS, the query is executed against a table of data and rows in the table are accessed to return some or all of the column values for the rows accessed, as required by the query being executed.

Indexes in RDBMS systems are typically smaller than their related data tables and are used to improve the performance of queries on the table data. The use of an index can reduce the amount of table data which is accessed in order to satisfy a given query.

A typical implementation of an index on a table in an RDBMS stores ordered key values and associated RIDs (row identifiers) which uniquely identify a row in the table being indexed.

A typical configuration of an RDBMS, such as the DB2™ relational database, includes a data manager (DMS) which is a component that handles retrieval of data from pages in a table, given a specific request for data. Such a request may specify a data record (or row) to be returned, based on an RID, or based on a query predicate which defines characteristics of the data being sought. Also typical in an RDBMS is an index manager component which is used to retrieve key values and RIDs from the index based on query key values or index predicates defined by the query.

Typically the data manager sends a request to the index manager to return the first or next RID in the index which matches the query (including range and/or index predicates). When the index manager returns a matching RID, the key and RID values are copied from the index leaf node.

For certain database queries, a data manager may repeatedly make calls to an index manager, seeking to have sequentially ordered key valued RIDs returned to the data manager. In such a case, the code path followed in executing the query may be significant, and a substantial portion of this code path may relate to data manager calls to the index manager and to the related returns from the index manager.

It is therefore desirable to have a query processing system which is able to execute queries in a manner which has increased efficiency by reducing the frequency of calls from the data manager to the index manager.

SUMMARY OF THE INVENTION

According to one aspect of the present invention, there is provided an efficient index access to data by use of a callback from the index manager to the data manager.

According to another aspect of the present invention, there is provided a method for processing a database query in a database management system comprising a data manager, a set of data, an index manager and an index on the data, the data manager supporting index-data fetches, predicate checking and data consuming operations, the method comprising the steps of:

a. calling the data manager to access query-specified data in the set of data, b. for an index-data fetch, the data manager calling the index manager to locate a data identifier in the index corresponding to a selected key value, and where a predicate check or data consuming operation is possible, the data manager requesting a callback from the index manager, c. the index manager carrying out index manager index-data fetch steps by i. locating a data identifier in the index for the selected key value and where there is no data identifier for the selected key value, returning a result of no index entry found, ii. where a data identifier is located and a callback is requested, the index manager initiating a callback to the data manager for determining whether the data specified by the data identifier is to be returned to the runtime, iii. the data manager locating the data specified by the data identifier and determining whether a predicate check or consuming operation on the data are possible and where such operations are possible carrying out the operations and returning a no data return condition to the index manager, and d. where the index manager receives a no data return condition from the callback to the data manager, and where there is a next data identifier for the selected key value in the index the index manager, the index manager continuing to carry out the index manager index-data fetch steps for the next data identifier.

According to another aspect of the present invention, there is provided the above method for a database management system with an index including pages having index nodes, the method further including the steps of the index manager stabilizing the page containing the node to be accessed in the index to locate the data identifier for the selected key value, and the index manager not releasing the stabilization of the page during callback to the data manager.

According to another aspect of the present invention, there is provided the above method for a database management system with the index comprising pages having index nodes, the database management system supporting a set of access processes potentially able to access the index, the method further comprising the step determining if a one of the set of access processes is waiting for an exclusive latch for accessing the index, and where a one of the access processes is waiting, the index access step copying the data identifier and key value from the index and releasing stabilization of any pages in the index prior to the callback to perform the data access step.

According to another aspect of the present invention, there is provided a method for processing a database query in a database management system to return data to a user, the database management system having a set of data, and an index on the set of data, the database management system supporting an index-data fetch operation and supporting a pushdown index-data fetch operation where a subset of the set of data is accessed without the subset being returned to the user, the method including the steps of:

a data access step to locate an identified portion of the set of data corresponding to a located data identifier where for an index-data fetch the data access step uses an index access step to determine the located data identifier for a specified key value, the index access step locating the data identifier in the index for the specified key value, or returning a not found indicator where there is no data identifier in the index for the specified key value, and where a database query is processed having a potential pushdown index-data fetch, the index access step using a callback to perform the data access step for carrying out the potential push-down process for successive data identifiers in the index for the specified key value.

According to another aspect of the present invention, there is provided a program storage device readable by a machine, tangibly embodying a program of instructions executable by the machine to perform the above method steps for processing queries for a database.

According to another aspect of the present invention, there is provided a query processing system having a data manager, a set of data, an index manager and an index on the set of data, the data manager supporting index-data fetches, and predicate checking and data consuming operations, the data manager including a callback-enabling component for an index-data fetch where a predicate check or data consuming operation is possible, the callback-enabling component requesting a callback from the index manager, a callback-execution component for determining if a predicate check or consuming operation on a defined subset of the set of data is possible and where such operations are possible, carrying out the operations and returning a no data return condition, the index manager including a data manager callback component for initiating a callback to the data manager for an index-specified subset of the ordered set of data to determine if a predicate check or consuming operation on the index-specified defined subset of the set of data is possible, an index access component for continuing the index-data fetch steps by locating the next one of the data identifiers for the selected key value or returning a result of no index entry found, the index access component being invoked where the index manager receives a no data return condition from a callback to the data manager.

According to another aspect of the present invention, there is provided an improved data manager and an improved index manager, the data manager supporting pushdown processing and including a callback-enabling component for an index-data fetch where pushdown processing is possible, the callback-enabling component requesting a callback from the index manager, and a callback-execution component for determining if for a specified row, pushdown processing is possible and where such processing is possible, carrying out the processing and returning a no data return condition, the index manager including a data manager callback component for initiating a callback to the data manager for an index-specified row in the table data to determine if pushdown processing on the row is possible, and an index access component for continuing the index-data fetch steps by continuing to access the index and use the data manager callback component where the index manager receives a no data return condition from a callback to the data manager.

Advantages of the present invention include an index access to data during query execution that results in reduced calls to the index manager, in a best case query execution, and no significant inefficiency introduced in a worse case execution.

BRIEF DESCRIPTION OF THE DRAWING

The preferred embodiment of the invention is shown in the drawing, wherein.

Figure 1:
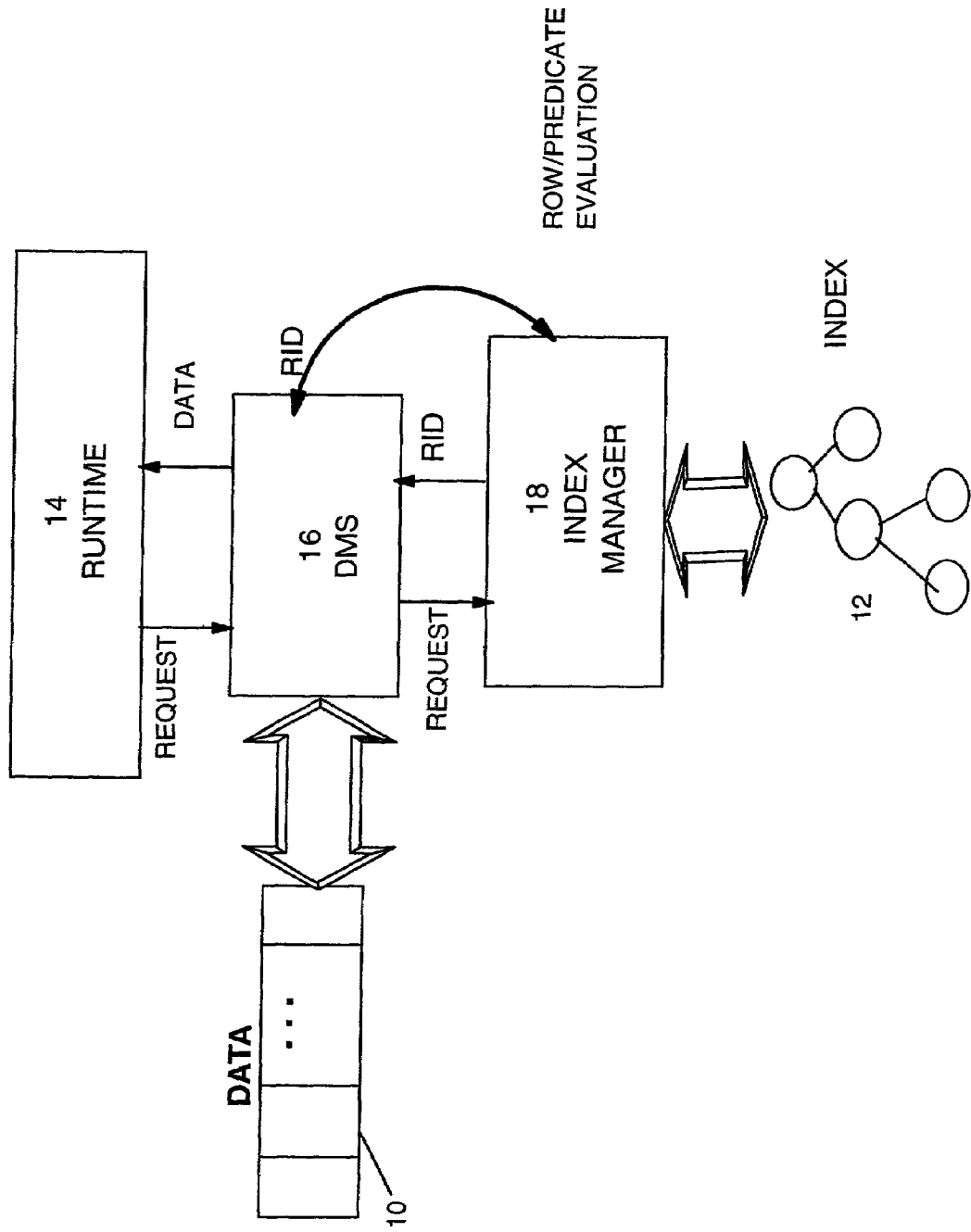
FIG. 1 is a block diagram showing request and data flow in query execution according to the preferred embodiment of the invention.

In the drawing, the preferred embodiment of the invention is illustrated by way of example. It is to be expressly understood that the description and drawing are only for the purpose of illustration and as an aid to understanding, and are not intended as a definition of the limits of the invention.

DETAILED DESCRIPTION

The system of the preferred embodiment processes queries against an indexed set of data. FIG. 1 is a block diagram showing the request and data flow in a query execution, according to the preferred embodiment. The preferred embodiment relates to a query processing system such as that found in a relational database management system (RDBMS). The preferred embodiment is described with reference to the RDBMS architecture found in the DB2™ system, but it will be understood by those skilled in the art that the advantages of the preferred embodiment may be achieved in different systems having similar components to those set out in FIG. 1.

Both data table 10 and index 12 are shown in the block diagram of FIG. 1, with associated runtime component 14, data management component (DMS or data manager) 16 and index manager 18. Runtime 14 executes an access plan (that may be generated, for example, by an SQL compiler) and runtime 14 results in requests for data being sent to data manager 16. The request and data flow between the components in FIG. 1 are shown by arrows in the figure.

Both request and data flow for the prior art arrangement, and the request and data flow according to the preferred embodiment, may be described with reference to FIG. 1. Query execution as carried out by the prior art starts with a request from runtime 14 to data manager 16. Requests to data manager 16 specify a direct access to data table 10, or may seek to have data fetched from data table 10 by using index 12. Where the request to data manager 16 requires an index access, data manager 16 issues a request to index manager 18 (including index predicates, if applicable). Index manager 18 interrogates index 12 to locate the first or next key value in index 12 matching the key value requested. The RID (record or row identifier) retrieved from index 12 by index manager 18 is passed back to data manager 16. Data manager 16 then uses the RID to access data table 10.

For each index access by index manager 18 there is an associated cost. In the index of the preferred embodiment the index is a tree structure and the nodes of the index are stored on pages. The step of accessing a node in the tree structure carries with it the cost of executing the code to carry out the access, as well as the cost in stabilizing or latching the page containing the node being accessed. For this reason, where there are repeated data access steps being carried out by use of an index in a query execution, there will be significant time costs associated with the index access portion of the execution.

These time costs become proportionally greater where, as occurs in certain query processing system contexts, an index may be accessed several times before data values are returned to the runtime. How this type of index access may occur is set out below.

Using the architecture shown in FIG. 1, an approach to increasing the efficiency of a query processing system may be described. According to this approach, when data manager 16 locates a row in data table 10, data manager 16 carries out a predicate check on the data in the located row or record in data table 10. The row or record specified by the RID returned from index manager 18 will be compared to a predicate (if any) in the query being processed. Only if the predicate is satisfied will data manager 16 return the relevant data from data table 10 to runtime 14. Alternatively, where the query involves an aggregation operation (such as the SQL operations SUM, COUNT or AVERAGE) the row or record located in data table 10 may be "consumed" by data manager 16 carrying out the aggregation operation on the row. This approach to query processing, which results in predicate checks and data consuming operations being carried out by the data manager, is sometimes called a push-down processing approach to query processing. The predicate check or data consuming operations are pushed down to the data manager level in the query processing system.

Where such a predicate check results in the row being found to not satisfy the search predicate, or the row is consumed in a aggregation operation, data manager 16 does not return the data to runtime 14. Rather, data manager 16 issues a new request to index manager 18 to locate the next key containing a RID having a key matching the key value being sought. Potentially, this series of steps may be repeated numerous times, for repeated rows that do not match the search predicate or where rows are being consumed. In this manner, index 12 may be accessed a number of times without data being returned to runtime 14 by data manager 16. As indicated above, for such a query a significant proportion of the query execution time will be spent in accessing the index pages where the relevant nodes of the index are located.

According to the preferred embodiment, when a query execution occurs which involves an index-fetch (both the index and the table data are to be accessed), data manager 16 will specify to index manager 18 that a callback to data manager 16 is required for each qualifying RID located by index manager 18 in index 12. When index manager 18 locates a key matching the index predicates from data manager 16, index manager 18 determines whether a callback has been requested by data manager 16. If a callback is requested, index manager 18 calls data manager 16, passing the RID located by index manager 18. As a result, data manager 16 will access data table 10 and determine whether the record corresponding to the RID provided by index manager 18 qualifies in relation to the data predicate or whether the row is "consumed", as described above.

If the row in data table 10 corresponding to the RID located in index 12 does not qualify (does not match the query predicate) or the row is consumed, the data page containing the row is released or unlatched and a result is returned to index manager 18 by data manager 16 to indicate that the row corresponding to the RID is not to be returned to runtime 14.

Index manager 18 then continues to search index 12 to locate the next key and RID combination in the index. Index manager 18 effectively treats the callback to data manager 16 as the processing of an index predicate. Here, however, the code path inherent in the data manager making repeated calls to index manager 18, has been avoided. Furthermore, the key and RID pair located initially by index manager 18 need not be copied from index 12 and the page containing the leaf node need not be released or unlatched, while the callback to data manager 16 is occurring. In this way, efficiencies are introduced to the query processing where the queries result in repeated access to index 12 without data from data table 10 being passed back to runtime 14.

Alternatively, in its callback to data manager 18, index manager 18 may passes a RID identifying a row in data table 10 which matches the data predicates defined by the query, or which is otherwise to be returned to runtime 14. In such a case the preferred embodiment maintains the latch on the data page and data manager 16 returns a successful result to index manager 18. Index manager 18 then releases the latch on the page in index 12 containing the current index node. Index manager 18 returns the key and RID to data manager 16. Upon return from index manager 18, the data page in data table 10 remains latched and the position of the table's row is used to process the return of the data from data manager 16 to runtime 14. In this case, the preferred embodiment offers no performance improvement over prior art approaches but neither is there a significant inefficiency introduced in the steps carried out.

As can be seen from the above description, the approach of the preferred embodiment provides the advantage of avoiding repeated calls to index manager 18 from data manager 16, where RIDs located by index manager 18 relate to rows in data table 10 which are not returned to runtime 14.

In RDBMSs which permit concurrent access to data tables and indices, mechanisms are implemented to latch portions of the data tables and indices. The latches may apply to pages or to individual rows or records in the data tables or indices. Latches may be exclusive or sharable. Where an index manager returns a RID which corresponds to a key value, the key value and RID are copied from the index leaf page to permit the index manager to continue with a scan through the index for a subsequent call based on that key RID previously returned. The index manager then releases or unlatches the index leaf page containing the key and RID, returned.

In the implementation of the preferred embodiment, it is important to note that latching of the data and index pages is done in a share mode (a read access mode). Because there are no exclusive latches in the above execution path, this callback mechanism avoids a "dead latch" situation, a dead lock relating to the latching requirements of the different processes.

A further issue raised with the preferred embodiment relates to index manager 18 holding an index page latched while index manager 18 performs a callback to data manager 16. As will be apparent, data manager 16 will access data table 10 based on the RID passed to data manager 16 by index manager 18. The access of the data table by data manager 16 may result in the required data page from data table 10 being read from disk into a buffer pool memory. Because such I/O operations are expensive, the latch held by index manager 18 on the page in index 12 may extend for an undesirable length of time and therefore result in unacceptable wait times for other processes seeking to use the page in the index.

To reduce the occurrences of an index page being held latched across a data page I/O operation, the preferred embodiment includes a precondition that must be satisfied before the callback to data manager 16 is carried out. Index manager 18 determines whether there are any processes or threads waiting for an exclusive latch on the index page in question. In the preferred embodiment, this inquiry is made to a latch manager component in the RDBMS. If there are no processes waiting for an exclusive latch on the index page, the callback to data manager 16 is made. If there is a process waiting for an exclusive latch on the index page in index 12, then the key value and RID are copied from the page in index 12 and the index page is released, or unlatched, before the callback is done. The benefit of the callback procedure is reduced in this second circumstance. The instruction code path for the entry and exit of index manager 18 is avoided but a cost is incurred in copying the key value and RID before unlatching the page.

It will be appreciated by those skilled in the art that other approaches may be taken to prevent undesirably long latches being held on the pages in index 12. For example, index manager 18 may determine whether the page corresponding to the RID is in the data table buffer pool at the time that the callback is being carried out. An alternative approach is for data manager 16 to determine whether an I/O operation will be required for each page accessed. If an I/O operation is required, then the indexed page may be released.

Although a preferred embodiment of the present invention has been described here in detail, it will be appreciated by those skilled in the art, that variations may be made thereto. Such variations may be made without departing from the spirit of the invention or the scope of the appended claims.

What is claimed is:

1. A method for processing a database query on a set of data in a database management system having a data manager and an index manager, the method comprising the steps of:
   a) in response to a data manager call to locate a data identifier in an index corresponding to a selected key value, performing the steps of:
      i) locating the data identifier in the index for the selected key value; and
      ii) issuing a callback to the data manager; and
   b) continuing to carry out an index-data fetch for another data identifier if there is another data identifier for the selected key value in the index and the index manager receives a specific condition from the data manager in response to the callback.

2. The method of claim 1 wherein step a) further comprises:
   iii) determining whether the data specified by the data identifier is to be returned to a runtime; and
   iv) allowing the data manager to locate the data specified by the identifier and make a determination.

3. The method of claim 2 wherein the determination involves determining whether a predicate check or a data consuming operation on the data are possible.

4. The method of claim 3 wherein the predicate check or the data consuming operation is performed if it is possible to perform the predicate check or the data consuming operation and a specific condition is returned to the index manager.

5. The method of claim 4 wherein the specific condition comprises a no data return condition.

6. The method of claim 2 wherein the index comprises a plurality of pages having index nodes and the method further comprises the steps of:
   c) allowing the index manager to stabilize a page containing a node to be accessed in the index to locate the data identifier for the selected key value wherein the index manager does not release the stabilization of the page during a callback to the data manager.

7. The method of claim 1 wherein the index comprises a plurality of pages having index nodes and the database management system supports a set of access processes potentially able to access the index, the method further comprising the steps of:
   c) determining if one of the set of access processes is waiting for an exclusive latch for accessing the index;
   d) utilizing the index manager to copy the data identifier and key value from the index if there is such an access process; and
   e) releasing stabilization of any pages in the index prior to any callback to the data manager.

8. The method of claim 1, wherein step a) further comprises:
   iii) specifying that a callback is required when the data identifier is located.

9. A computer readable medium containing program instructions processing a database query on a set of data in a database management system having a data manager and an index manager, the program instructions comprising the steps of:
   a) in response to a data manager call to locate a data identifier in an index corresponding to a selected key value, performing the step of:
      i) locating the data identifier in the index for the selected key value; and
      ii) issuing a callback to the data manager; and
   b) continuing to carry out an index-data fetch for another data identifier if there is another data identifier for the selected key value in the index and the index manager receives a specific condition from the data manager in response to the callback.

10. The computer readable medium of claim 9 wherein step a) further comprises:
    iii) determining whether the data specified by the data identifier is to be returned to a runtime; and
    iv) allowing the data manager to locate the data specified by the identifier and make a determination.

11. The computer readable medium of claim 10 wherein the determination involves determining whether a predicate check or a data consuming operation on the data are possible.

12. The computer readable medium of claim 11 wherein the predicate check or the data consuming operation is performed if it is possible to perform the predicate check or the data consuming operation and a specific condition is returned to the index manager.

13. The computer readable medium of claim 12 wherein the specific condition comprises a no data return condition.

14. The computer readable medium of claim 10 wherein the index comprises a plurality of pages having index nodes and the program instructions further comprises the steps of:
    c) allowing the index manager to stabilize a page containing a node to be accessed in the index to locate the data identifier for the selected key value wherein the index manager does not release the stabilization of the page during a callback to the data manager.

15. The computer readable medium of claim 10 wherein the index comprises a plurality of pages having index nodes and the database management system supports a set of access processes potentially able to access the index, the program instructions further comprising the step of:
    c) determining if one of the set of access processes is waiting for an exclusive latch for accessing the index;
    d) utilizing the index manager to copy the data identifier and key value from the index if there is such an access process; and
    e) releasing stabilization of any pages in the index prior to any callback to the data manager.

16. The computer readable medium of claim 9, wherein step a) further comprises:
    iii) specifying that a callback is required when the data identifier is located.

* * * * *